June 30, 1931.                M. SMITH                1,812,177
                          GLARE ELIMINATOR
                        Filed May 20, 1930
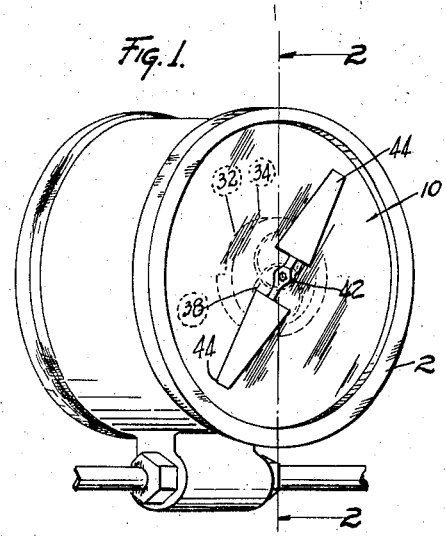
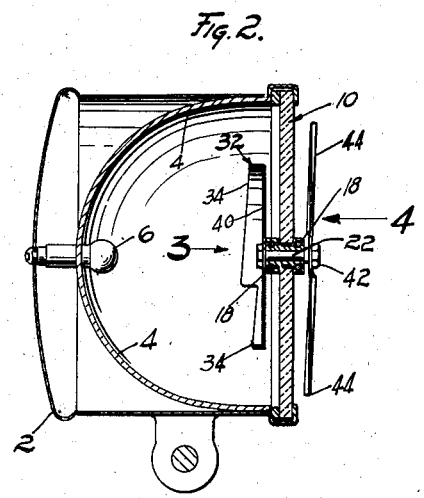
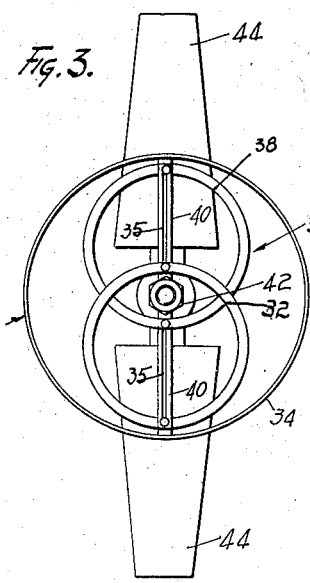
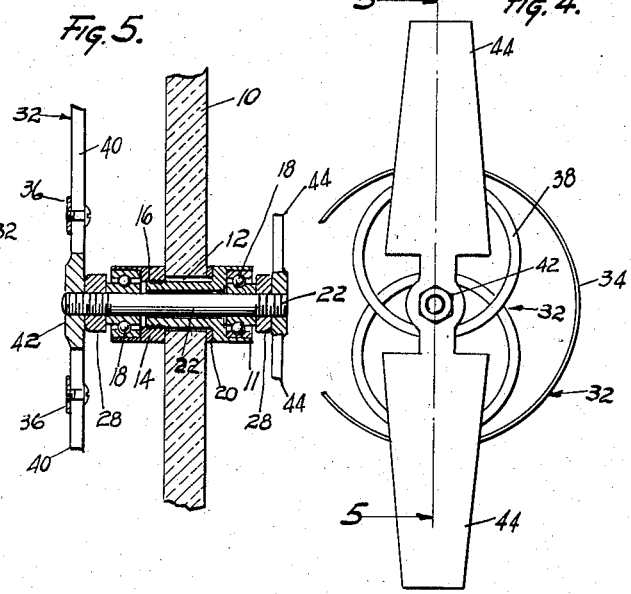
Inventor
MACK SMITH.
By Fred D Hays
Attorney Patented June 30, 1931

1,812,177

UNITED STATES PATENT OFFICE

MACK SMITH, OF SANTA MONICA, CALIFORNIA

GLARE ELIMINATOR

Application filed May 20, 1930. Serial No. 453,969.

My invention relates to light reflecting devices, such as, and more particularly for headlights for motor vehicles, and all other devices where reflected light is used, with or without a light accentuating means, such as a lens, said invention being adapted effectively to eliminate the glare of said devices, and at the same time accentuate the effect of said rays, it being possible to adjust same so an accentuated light beam may be produced for use on foggy nights.

It accordingly is an object of my invention to provide a novel form of glare eliminating means, preferably adapted to be associated with a transparent member such as a lens, or even an ordinary glass plate, adapted for use in connection with motor vehicle headlights, or any other lights or lamps where reflected light is produced, said invention effectively eliminating all glare of said lights or lamps.

In its preferred form, my invention comprises a set of devices, at least one of which is positioned on one side of a transparent member and may be both a light shearing and propelling means for another light shearing means, positioned on the other side of said member, said means preferably comprising a light collector preferably of ring form, itself having means for shearing light rays, at least two adjustable light shearing rings being positioned within said collector, capable of adjustment to the candle power of the light source with which it is adapted to be used, said rings, when superimposed being adapted to accentuate the light from said light source, especially on foggy nights, and an anti-friction shaft connecting the means upon both sides of said transparent member, which shaft is adapted for lubrication.

The above and further objects and advantages of my invention, as will hereinafter more fully appear, I attain by the construction described in the specification, and illustrated in its preferred form on the drawings, forming a part of my application.

Reference is had to the accompanying drawings, in which similar reference characters denote similar parts. In the drawings, Fig. 1 is a perspective view of my invention, showing one application thereof, that is, when applied to the headlight of a motor vehicle, Fig. 2 is a cross-sectional view, taken on the line 2—2, Fig. 1, Fig. 3 is an enlarged rear elevational view of my invention removed from the headlight, looking in the direction of the arrow 3, Fig. 2, Fig. 4 is a front elevational view of Fig. 2, looking in the direction of the arrow 4, Fig. 2, and Fig. 5 is an enlarged fragmentary cross-sectional view, taken on the line 5—5, Fig. 4.

Describing my invention more in detail, in its broader aspects said invention comprises a set of glare eliminating devices positioned on both sides of a transparent member, and preferably centrally thereof, one of said members, if desired, comprising a self propelling means, propelled by wind, or other means, and itself comprising a glare eliminating means, the device or means on the other side of said member comprising a combined light ray collector and anti-glare means, said devices being connected by means of a shaft, mounted in anti-friction bearings, which bearings and shaft are capable of being lubricated in any manner in practice preferred.

More specifically my invention comprises a transparent member 10, adapted to be associated with the headlight 2 of conventional or other form, which headlight has the usual light source 6, and the reflector 4. It will of course be understood that my invention may be associated with other sources of reflected light, and may be positioned upon any transparent means, which includes a lens of any character.

Preferably centrally positioned with respect to the member 10, I provide said member with a shaft 22, extending through a hole 12 therein, and mounted to rotate in anti-friction bearings 18, housed in male and female closures 11 and 14, adapted to be held together by the threads 16 (Fig. 5), the assembly being held in secured relation by suitable means, such as the nuts 28, screwed on to the shaft 22, a suitable washer 20, being used as a spacer, to prevent injury to the member 10. It will, of course, be understood that in practice the shaft 22 and bearings 18 may be lubricated in any suitable manner.

Preferably mounted externally of the member 10 is a propelling means comprising any preferred number of blades, preferably two in number and shaped as shown, and positioned in offset and in inclined relation to each other as more particularly shown in Fig. 2, to provide for an efficient rotation thereof, by the wind, as the motor vehicle moves forwardly, said blades being suitably connected to a hub by means of which said propelling means may be detachably mounted upon the rotatable shaft 22 in any preferred manner.

The propelling means 44 itself functions as a glare eliminator, the rays of light coming from the light source 6 and reflected by the reflector 4, being sheared by the blades of said means, materially assisting in removing the objectionable glare from the headlight or other illuminating means.

On the other side, and internally of the transparent member 10, is positioned the combined light collector and glare eliminating means, designated generally by the reference numeral 32, said means comprising a light collector ring 34, which has a mounting 40 extending thereacross, which mounting is centrally provided with a hub 42 by which said light collector ring is mounted upon the shaft 22, as by screwing the same thereon, the propelling means 44 being adapted to rotate said light collector ring by means of said shaft.

If desired, the periphery of the light collector ring 34 may be provided with suitable cut-out or cut away portions (Figs. 1 and 2) to assist in shearing the light rays coming from the light source 6 to assist in eliminating the objectionable and dangerous glare.

Another very important feature of my invention resides in the adjustable glare eliminating rings 38 (Figs. 3 and 4, more particularly) which rings may be flat, and are provided with a suitable adjusting means, such as the screw bolt, and nut assembly 36, operable in the slots 35 (Fig. 3) in the member 40. This construction permits the rings 38 to be adjusted toward and away from each other, so they will overlap, a portion of one of said rings being positioned in substantial alignment with the light source 6, thus effectively insuring that the light rays will be sheared when the glare eliminator 32 is rotated by the propelling means 44.

Should it be desired to accentuate the light from the light source 6, such as on a foggy night, the rings 38 are adjusted so they will be placed in alignment, thus concentrating the light rays in one light beam, which has a marked light penetrating effect.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. In a glare eliminator for use in connection with the reflected light of a light source, a transparent member through which the rays of said light source are adapted to pass, means on the inside of said transparent member for shearing said light rays, and means on the outside of said member for propelling said last mentioned means.

2. A glare eliminator adapted for use in connection with a light source, a transparent member through which the rays of light from said light source are adapted to pass, revoluble light shearing means on one side of said member, and means on the other side of said member for rotating said light shearing means.

3. A glare eliminator adapted for use in connection with a light source, a transparent member associated with said light source, revoluble light shearing means on one side of said member, means associated with said light shearing means for adjusting the latter with respect to the candle power of said light source, and means for propelling said light shearing means on the other side of said member.

4. A glare eliminator adapted for use in connection with a light source, a transparent member associated with said light source, adjustable light shearing means on one side of said member, and wind propelled means on the other side of said member for propelling said light shearing means, said wind propelled means being also a light shearing means.

5. A glare eliminator adapted for use in connection with a light source, a transparent member associated with said light source and combined light shearing and light collecting means on both sides of said member whereby the glare of said light will be eliminated but at the same time accentuate the light from said light source.

6. In a glare eliminator adapted for use in connection with a light source and a light reflector, a transparent member, a combined light shearing and propelling means on one side of said member, and a combined light collecting and light shearing means on the other side of said member, said propelling means being adapted to propel said combined light collecting and light shearing means.

7. A combined light collector and light shearing means adapted for special use in connection with a light source and its reflector, a light collector ring having means for shearing the rays of light from said light source, and at least two adjustable light shearing rings associated with said ring for shearing said rays of light, according to the candle power thereof, a portion of one of said rings being in direct alignment with said light source when the glare thereof is to be eliminated, said rings being positioned in alignment when said light is to be accentuated.

8. Glare eliminating means adapted for special use in connection with a light source and its reflector, a transparent member, a shaft extending centrally through said member, anti-friction means associated with said shaft, said shaft being adapted to be lubricated, and glare eliminating means detachably mounted on said shaft on both sides of said member, one of said means being adapted to propel the other.

In testimony whereof I have signed my name to this specification.

MACK SMITH.